United States Patent
Chujo

(10) Patent No.: US 6,680,757 B1
(45) Date of Patent: Jan. 20, 2004

(54) ENVIRONMENTAL MAGNETISM COMPENSATING DEVICE AND CATHODE-RAY TUBE DISPLAY DEVICE

(75) Inventor: Takeshi Chujo, Tokyo (JP)

(73) Assignee: NEC-Mitsubishi Electric Visual Systems Corporation, Tokyo (JP)

( * ) Notice: Subject to any disclaimer, the term of this patent is extended or adjusted under 35 U.S.C. 154(b) by 0 days.

(21) Appl. No.: 09/347,515

(22) Filed: Jul. 2, 1999

(30) Foreign Application Priority Data

Dec. 15, 1998 (JP) .......................... P10-355813

(51) Int. Cl.$^7$ .............................. H04N 9/29; H04N 9/28
(52) U.S. Cl. ...................... 348/820; 348/806; 315/370; 315/8
(58) Field of Search ................................ 348/805, 806, 348/820, 807; 315/8, 85, 370; 361/150; 313/413; H04N 9/29, 9/28, 3/22, 3/26

(56) References Cited

U.S. PATENT DOCUMENTS

| | | |
|---|---|---|
| 5,017,832 A | 5/1991 | Takita |
| 5,066,891 A | 11/1991 | Harrold et al. |
| 5,223,768 A | 6/1993 | Izawa et al. |
| 5,642,175 A * | 6/1997 | Hirakawa .................... 348/806 |
| 5,847,511 A | 12/1998 | Lee |
| 6,194,848 B1 * | 2/2001 | Lee ............................. 315/370 |
| 6,246,448 B1 * | 6/2001 | Park ............................ 348/820 |

FOREIGN PATENT DOCUMENTS

| | | |
|---|---|---|
| DE | 196 32 127 A1 | 2/1998 |
| EP | 0657913 A1 | 6/1995 |
| GB | 2187919 A | 9/1987 |
| JP | 58138191 | 8/1983 |
| JP | 6239994 | 2/1987 |
| JP | 04109538 A | 4/1992 |
| JP | 4109538 | 4/1992 |
| JP | 6-78317 A | 3/1994 |
| JP | 7-107503 A | 4/1995 |
| JP | 10164612 | 6/1998 |
| JP | 10164612 A | 6/1998 |
| JP | 10-243410 A | 9/1998 |
| JP | 10243412 | 9/1998 |

* cited by examiner

*Primary Examiner*—Michael H. Lee
(74) *Attorney, Agent, or Firm*—Birch, Stewart, Kolasch & Birch, LLP

(57) ABSTRACT

A geomagnetism sensor (2) outputs the vertical magnitude of geomagnetism as a detection signal (Vy). An A-D converter (5) converts the detection signal (Vy) into digital data which in turn is supplied to a CPU (6) together with data from a memory (1). The CPU (6) performs a computation based on a vertical deflection signal (VH), the data from the memory (1) and the detection signal (Vy) to provide parameters (hposi, yvj, vcancel) for determining current values to be supplied to a deflection yoke (13), a convergence correction coil (14) and a beam landing correction coil (15). D-A converters (7–9) convert these parameters into analog signals. Drive circuits (10–12) receives the analog signals provided by conversion to generate current for driving the deflection yoke (13), the convergence correction coil (14) and the beam landing correction coil (15). Image variations under the influence of the vertical component of geomagnetism are automatically corrected.

18 Claims, 12 Drawing Sheets

F I G. 5
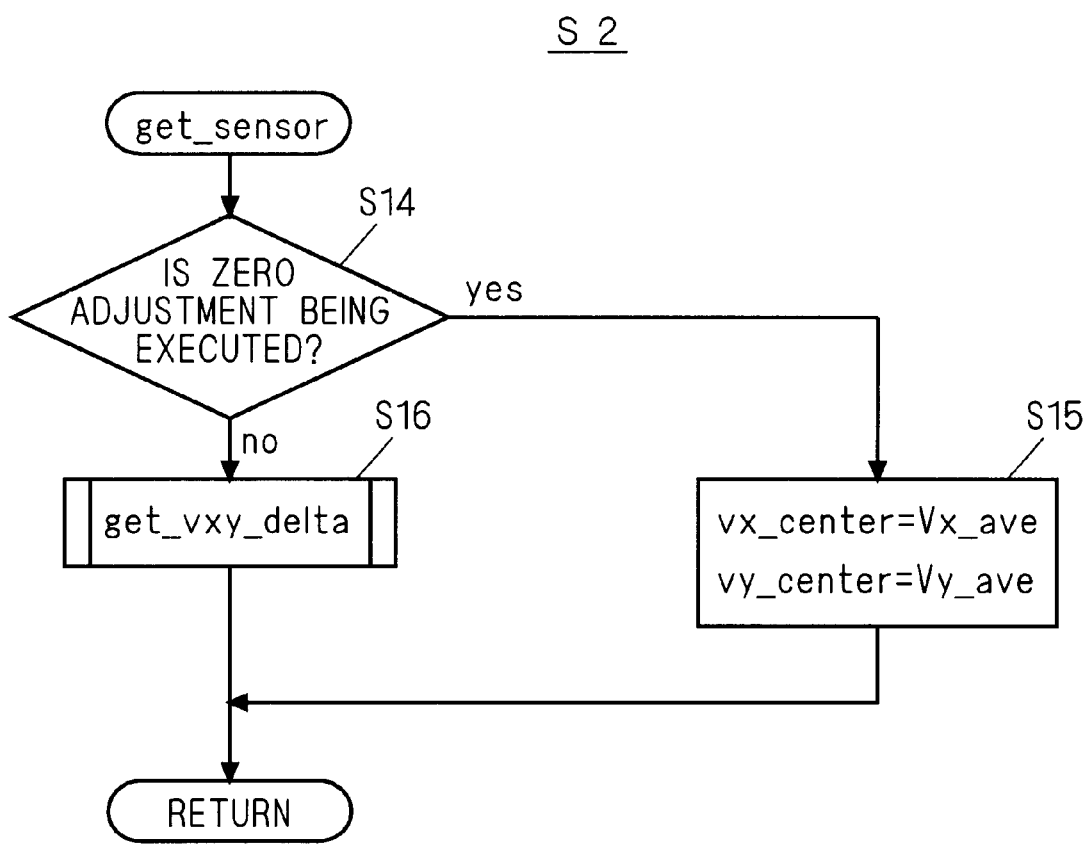

ENVIRONMENTAL MAGNETISM COMPENSATING DEVICE AND CATHODE-RAY TUBE DISPLAY DEVICE

BACKGROUND OF THE INVENTION

1. Field of the Invention

The present invention relates to a technique for compensating for the effects of an environmental magnetic field, particularly geomagnetism, in which a device is placed. More particularly, the invention relates to a geomagnetism compensating technique suitable for a high-resolution CRT display device for use as a computer display device.

2. Description of the Background Art

High-resolution CRT display devices for use as, e.g., computer display devices with 17- to 21-inch diagonal screens and with 1280-dot by 1024-line resolution have become predominant. Further, such devices with 22- to 24-inch diagonal screens have been increasingly required to provide a 1600-dot by 1200-line resolution. To meet the requirement for such a resolution, the currently prevailing pitch of phosphors is 0.28 mm. However, there is also a need for high-definition CRTs with a phosphor pitch as fine as 0.25 mm.

Unfortunately, such high-resolution computer CRT display devices are in some cases affected by geomagnetism, e.g. the vertical component thereof, to generate variations in horizontal image position, convergence and beam landing, causing degradation in image quality of the devices. In particular, the above-mentioned high-definition CRTs with fine phosphor pitch exhibit more profound effects of the same amount of horizontal image position variation, the same amount of misconvergence and the same amount of beam mislanding upon the degradation in device image quality than do CRTs with larger phosphor pitches, to show the adverse effects of geomagnetism, e.g. the vertical component thereof, which appear more significantly.

The following techniques have been proposed to prevent variations in horizontal image position, convergence and beam landing under the influence of such magnetism, e.g. the vertical component thereof:

(1) To prepare exposure designs separately for CRTs for use in the Northern Hemisphere and CRTs for use in the Southern Hemisphere since geomagnetism, e.g. the vertical component thereof, differs greatly between the Northern Hemisphere and the Southern Hemisphere on Earth.

(2) To enhance magnetic shielding to reduce the effects of geomagnetism, e.g. the vertical component thereof.

(3) To provide means for correcting the variations in horizontal image position, convergence and beam landing under the influence of geomagnetism, e.g. the vertical component thereof.

The technique (1) which prepares the separate CRT exposure designs increases costs and is therefore impractical. The technique (2) which merely enhances the magnetic shielding is insufficient to solve the problem. Hence, the technique (3) for correcting the horizontal image position variation, misconvergence and beam mislanding by using the correcting means has been examined.

FIG. 25 is a perspective view illustrating the correcting means of a CRT 16. The CRT 16 comprises a deflection yoke 13 serving as a fundamental part, and a convergence correction coil 14 and a beam landing correction coil 15 which are mounted around the neck thereof. The convergence correction coil 14 and the beam landing correction coil 15 are provided to correct misconvergence and beam mislanding, respectively. Respective correction currents are supplied to the deflection yoke 13 and the correction coils 14 and 15.

FIG. 26 is a block diagram of a circuit for supplying the correction currents. The circuit of FIG. 26 comprises a first individual adjustment means 17 which sets standard adjustment values for correction of the horizontal image position, misconvergence and beam mislanding, for example, during the manufacture of a CRT display device, and a second individual adjustment means 18 for correcting the variations in horizontal image position, convergence and beam landing under the influence of geomagnetism, e.g. the vertical component thereof, at the position of installation, for example, when the CRT display device is installed.

Each of the first and second individual adjustment means 17 and 18 supplies three correction current adjustment values to adder-subtracter circuits 19 to 21, respectively. The adder-subtracter circuits 19 to 21 perform addition and subtraction upon the adjustment values from the first and second individual adjustment means 17 and 18. The results of addition and subtraction from the adder-subtracter circuits 19 to 21 are supplied to drive circuits 22 to 24 for driving the deflection yoke 13, the convergence correction coil 14 and the beam landing correction coil 15, respectively. Thus, the correction currents in accordance with the adjustment values are supplied to the deflection yoke 13, the convergence correction coil 14 and the beam landing correction coil 15, respectively.

The geomagnetism-related correction using the circuit shown in FIG. 26 is required to adjust the second individual adjustment means 18 when the CRT 16 is installed, moved or changed in orientation thereof. However, such an adjustment requires special measuring equipment and expert knowledge for adjusting the horizontal image position, convergence and beam landing while making a measurement on a display screen of the CRT 16. Therefore, the technique (3) is disadvantageous in that a user that makes the adjustment by himself or herself finds difficulty in accomplishing a successful result and in that the installation or movement of the CRT display device requires a complicated procedure such as the visit of a serviceman having expert knowledge. Another disadvantage is that the above-mentioned correction circuit constructed in hardware form has a very complicated and large-scale circuit configuration.

SUMMARY OF THE INVENTION

According to a first aspect of the present invention, an environmental magnetism compensating device comprises: a magnetism sensor for detecting a vertical component of a magnetic environment in which a cathode-ray tube including a deflection yoke, a convergence correction coil and a beam landing correction coil is placed to output a detection signal; an arithmetic unit for determining first to third parameters based on the detection signal; and a driver for supplying current having values set based on the first to third parameters, respectively, to the deflection yoke, the convergence correction coil and the beam landing correction coil.

Preferably, according to a third aspect of the present invention, in the environmental magnetism compensating device of the first aspect, the current supplied to the convergence correction coil varies at two different rates of change for a time period corresponding to one frame in synchronism with a vertical deflection signal for the cathode-ray tube.

Preferably, according to a third aspect of the present invention, in the environmental magnetism compensating device of the first aspect, the current supplied to the convergence correction coil varies at two difference rates of change for a time period corresponding to one frame in synchronism with a vertical deflection signal for the cathode-ray tube.

Preferably, according to a fourth aspect of the present invention, in the environmental magnetism compensating device of the first aspect, the current supplied to the beam landing correction coil is in synchronism with a vertical deflection signal for the cathode-ray tube and has a waveform symmetrical with respect to a midpoint of a time period corresponding to one frame.

Preferably, according to a fifth aspect of the present invention, in the environmental magnetism compensating device of the first aspect, the current supplied to the beam landing correction coil is in synchronism with a vertical deflection signal for the cathode-ray tube and has a waveform asymmetrical with respect to a midpoint of a time period corresponding to one frame.

Preferably, according to a sixth aspect of the present invention, in the environmental magnetism compensating device of the fourth or fifth aspect, the current supplied to the beam landing correction coil has a variable DC level.

According to a seventh aspect of the present invention, a cathode-ray tube display device comprises: an environmental magnetism compensating device as recited in any one of the first to sixth aspects; and the cathode-ray tube.

In accordance with the environmental magnetism compensating device of the first aspect of the present invention, the values of current supplied to the deflection yoke for correcting a horizontal image position, the convergence correction coil for correcting misconvergence and the beam landing correction coil for correcting beam mislanding are set respectively based on the first to third parameters determined based on the vertical component of the magnetic environment. If the magnetic environment in which the CRT is placed is changed when the CRT is installed, moved or changed in orientation thereof, the arithmetic unit determines the first to third parameters suitable for the changed magnetic environment. Therefore, the environmental magnetism compensating device of the first aspect can make an automatic adjustment which corrects the variations in horizontal image position, convergence and beam landing without the need for special measuring equipment, expert knowledge and user's adjustment.

The environmental magnetism compensating device of the second aspect of the present invention can readily correct such misconvergence that the directions thereof on upper and lower parts of the CRT are opposite from each other under the influence of the vertical component of the magnetic environment.

The environmental magnetism compensating device of the third aspect of the present invention can correct misconvergence when the amount of misconvergence resulting from the vertical component of the magnetic environment differs between the upper and lower parts of the CRT, for example, due to the deviation of the position of electron guns.

The environmental magnetism compensating device of the fourth aspect of the present invention can readily correct beam mislanding which tends to decrease in upward and downward directions from the center of the CRT under the influence of the vertical component of the magnetic environment.

The environmental magnetism compensating device of the fifth aspect of the present invention can correct beam mislanding when the amount of beam mislanding resulting from the vertical component of the magnetic environment differs between the upper and lower parts of the CRT, for example, due to the deviation of the position of electron guns.

The environmental magnetism compensating device of the sixth aspect of the present invention can counteract the influence of variations due to individual differences in CRT which include variations in the beam landing correction coil when the device corrects beam mislanding resulting from the vertical component of the magnetic environment.

The cathode-ray tube display device of the seventh aspect of the present invention may be installed, moved and changed in orientation thereof without consideration of variations in horizontal image position, convergence and beam landing resulting from variations in the magnetic environment.

It is therefore an object of the present invention to provide a technique for making an automatic adjustment which corrects variations in horizontal image position, convergence and beam landing under the influence of geomagnetism, e.g. the vertical component thereof, when a CRT display device employing a high-definition CRT is installed or moved without the need for special measuring equipment, expert knowledge and user's adjustment.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5 through 9 are flowcharts showing the processing of subroutines according to the present invention;

DESCRIPTION OF THE PREFERRED EMBODIMENTS

Figure 1:
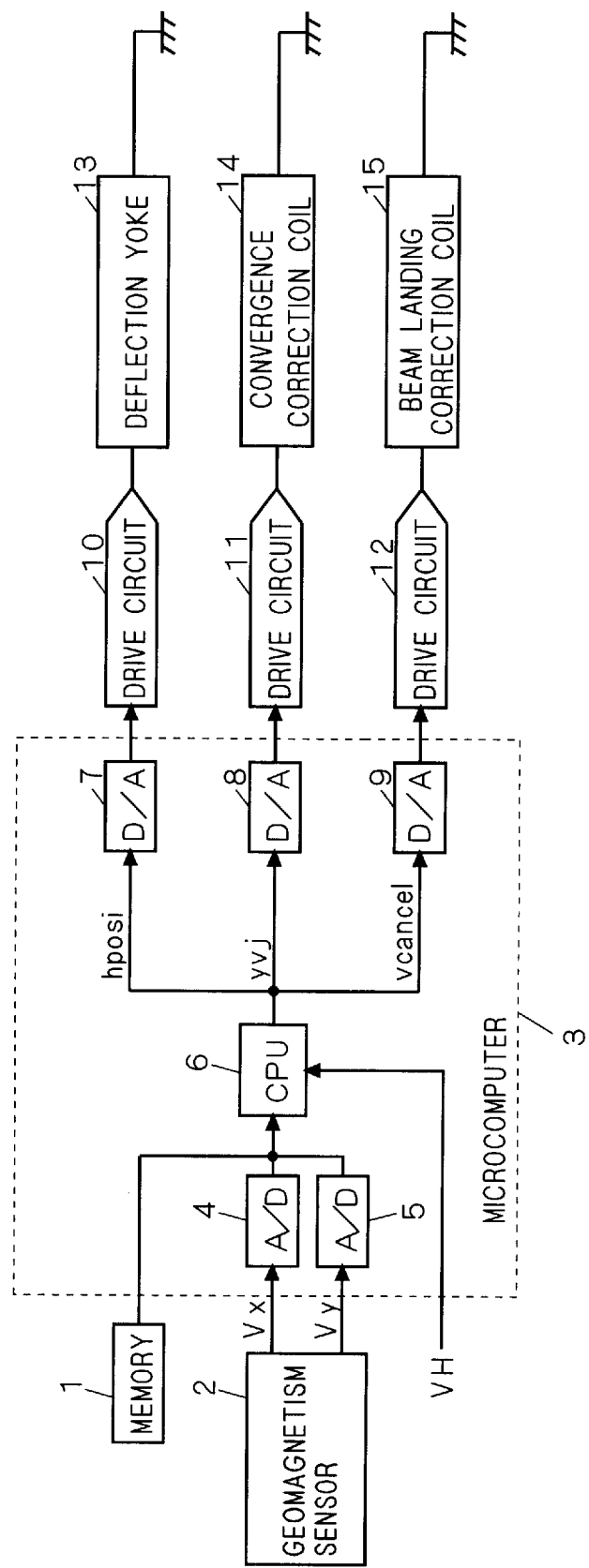
FIG. 1 is a block diagram illustrating a preferred embodiment of the present invention.
Figure 25:
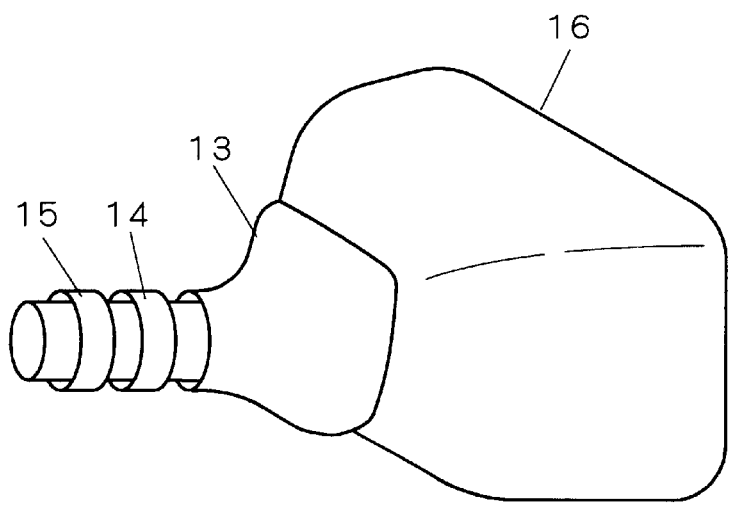
FIG. 25 is a perspective view illustrating a correcting means of a CRT.

FIG. 1 is a block diagram of a geomagnetism compensating device according to one preferred embodiment of the present invention, which is applicable to a CRT 16 shown in FIG. 25.

(I) Construction

Figure 2:
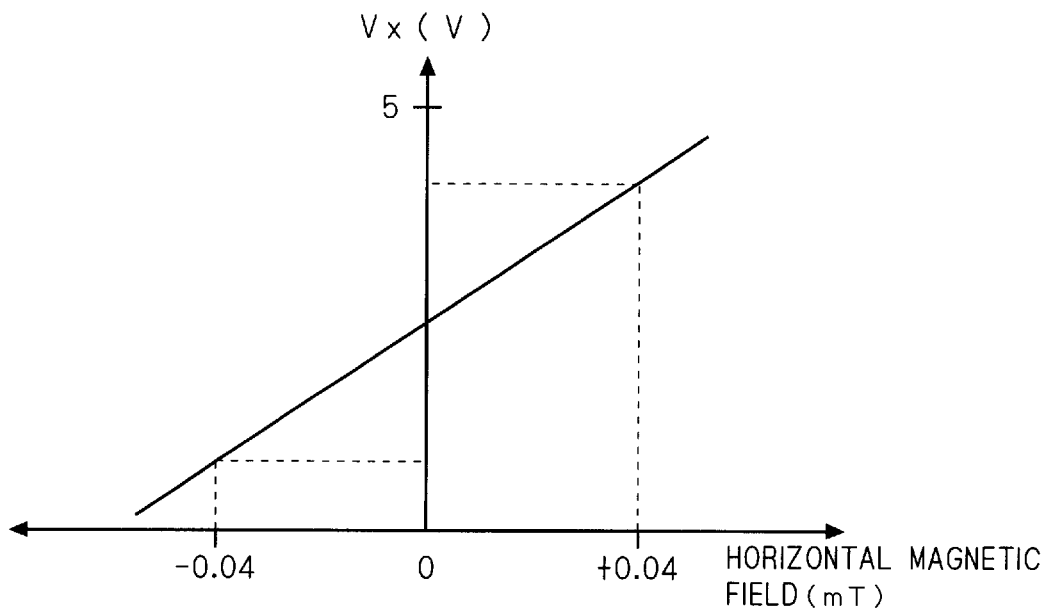
FIG. 2 is a graph showing a relationship between a horizontal magnetic field and a detection signal Vx.
Figure 3:
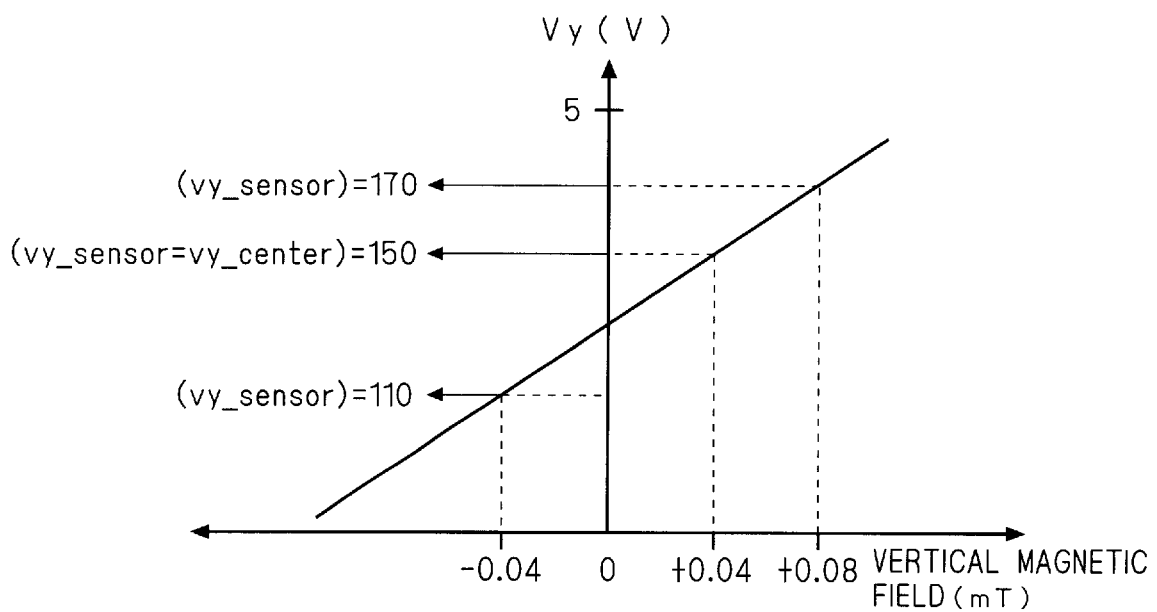
FIG. 3 is a graph showing a relationship between a vertical magnetic field and a detection signal Vy.

With reference to FIG. 1, a memory 1 stores therein, for example, adjustment values determined under predetermined conditions and set values such as a sensor reference value to be described later which are written during the manufacture of a CRT display device in a factory. A geomagnetism sensor 2 includes a means for detecting the direction of geomagnetism at a position where the CRT 16 is placed, to output detection signals Vx and Vy which respectively indicate the horizontal and vertical magnitudes of geomagnetism in the form of voltage. Such a magnetism sensor is disclosed, for example, in Japanese Patent Application Laid-Open No. P62-39994A (1987) and Japanese Patent Application Laid-Open No. P04-109538A (1992). FIG. 2 is a graph showing a relationship between a horizontal magnetic field and the detection signal Vx, and FIG. 3 is a graph showing a relationship between a vertical magnetic field and the detection signal Vy. The values of the detection signals Vx and Vy in the instance shown in FIGS. 2 and 3 increase with the increase in magnetic field intensity.

A microcomputer 3 receives the outputs from the memory 1 and the geomagnetism sensor 2. The microcomputer 3 includes A-D converters 4, 5, a central processing unit (referred to hereinafter as a CPU) 6, and D-A converters 7 to 9. The A-D converters 4 and 5 convert the detection signals Vx and Vy from the geomagnetism sensor 2 into digital data, respectively. The digital data from the A-D converters 4, 5 and the data from the memory 1 are supplied to the CPU 6. The CPU 6 performs computations in accordance with software to be described later based on a vertical deflection signal VH for the CRT 16, the data from the memory 1 and the detection signals Vx and Vy.

Figure 26:
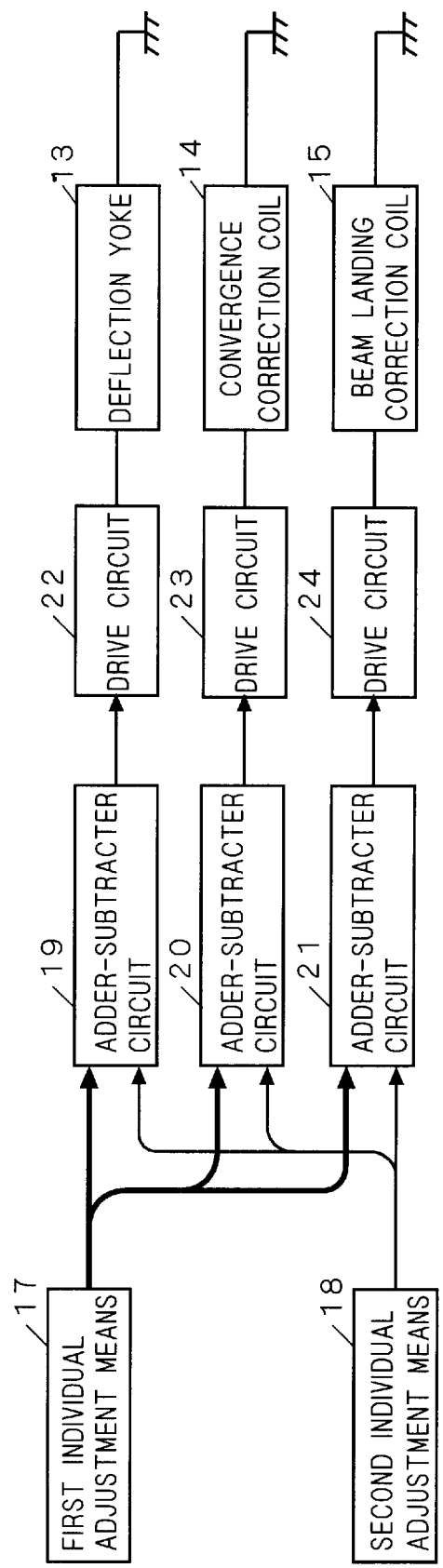
FIG. 26 is a block diagram showing a background art circuit.

As a result of the computations, the CPU 6 provides parameters hposi, yvj and vcancel which determine the current values to be supplied to a deflection yoke 13, a convergence correction coil 14 and a beam landing correction coil 15, respectively. The D-A converters 7 to 9 convert the parameters hposi, yvj and vcancel into analog signals, respectively. The analog signals from the D-A converters 7 to 9 are supplied to drive circuits 10 to 12, respectively. The drive circuits 10 to 12 provide currents for driving the deflection yoke 13, the convergence correction coil 14 and the beam landing correction coil 15, respectively, which are mounted around the neck of the CRT 16, for example, shown in FIG. 26.

The geomagnetism compensating device constructed as above described performs software processing to be described later in consideration for geomagnetism, e.g. the vertical component thereof, detected by the geomagnetism sensor 2 to determine the current values for driving the deflection yoke 13 which optimizes a horizontal image position, the convergence correction coil 14 which optimizes convergence, and the beam landing correction coil 15 which optimizes beam landing. Of course, a display device including such a geomagnetism compensating device and the CRT is contemplated within the scope of the present invention.

It should be noted that Japanese Patent Application Laid-Open No. P10-164612A (1998) does not disclose a technique which takes into consideration the vertical component of geomagnetism although it discloses the technique of detecting the direction and intensity of the horizontal component of geomagnetism to control current to be supplied to a correction coil by means of software.

(II) Details of Processing

(IIa) Main Routine

Figure 4:
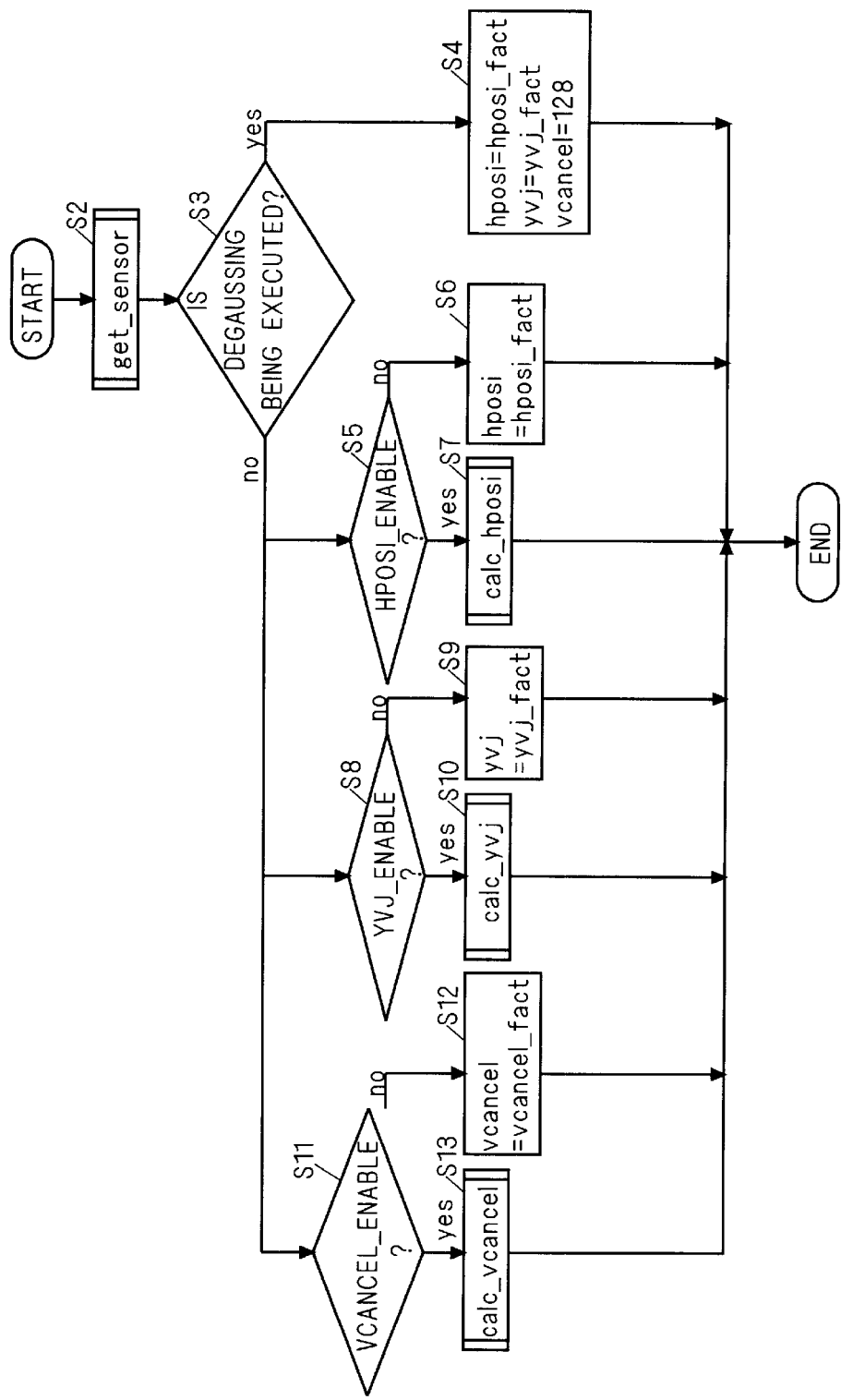
FIG. 4 is a flowchart showing a main routine according to the present invention.

FIG. 4 is a flowchart showing main processing (referred to herein as a main routine) according to the present invention. In the description below, it is assumed that digital values range from "0" to "255" with respect to current full scale.

At the start of the main routine, a subroutine get_sensor to be described later is executed in Step S2. Next, whether or not demagnetization (referred to hereinafter as degaussing) is being executed is judged in Step S3. This judgement is made, for example, when power is turned on after the installation of the display device. The judgement in Step S3 also includes a judgement as to whether or not degaussing provided in the display device is manually being executed.

If degaussing is not being executed in Step S3 (no), three groups of processes: a group of processes in Steps S5 to S7, a group of processes in Steps S8 to S10 and a group of processes in Steps S11 to S13 are executed in parallel or in sequential order. These three groups of processes are shown in FIG. 4 as individually leading to the end of the main routine for purposes of simplification. Precisely, the main routine is terminated when three processes: one of Steps S6 and S7, one of Steps S9 and S10 and one of Steps S12 and S13 are all completed.

Whether to make a correction (HPOSI_ENABLE) using the deflection yoke 13 or not is judged in Step S5. If the correction is not to be made (no), the flow proceeds to Step S6. If the correction is to be made (yes), the flow proceeds to Step S7. In Step S6, the CPU 6 gives a value hposi_fact as the parameter hposi to the D-A converter 7. The D-A converter 7 converts the value hposi_fact into an analog value, and the drive circuit 10 supplies the correction current to the deflection yoke 13 based on the analog value. The value hposi_fact is set, for example, under predetermined conditions (referred to hereinafter as a manufacturing environment: e.g. horizontal magnetic field=±0 mT and vertical magnetic field=+0.04 mT) during the manufacture of the CRT display device in a factory. In Step S7, a subroutine calc_hposi to be described later is executed.

Whether to make a correction (YVJ_ENABLE) at the convergence correction coil 14 or not is judged in Step S8. If the correction is not to be made (no), the flow proceeds to Step S9. If the correction is to be made (yes), the flow proceeds to Step S10. In Step S9, the CPU 6 gives a value yvj_fact as the parameter yvj to the D-A converter 8. The D-A converter 8 converts the value yvj_fact into an analog value, and the drive circuit 11 supplies the correction current to the convergence correction coil 14 based on the analog value. The value yvj_fact is set, for example, in the manufacturing environment. In Step S10, a subroutine calc_yvj to be described later is executed.

Whether to make a correction (VCANCEL_ENABLE) at the beam landing correction coil 15 or not is judged in Step S11. If the correction is not to be made (no), the flow proceeds to Step S12. If the correction is to be made (yes), the flow proceeds to Step S13. In Step S12, the CPU 6 gives a value vcancel_fact as the parameter vcancel to the D-A converter 9. The D-A converter 9 converts the value vcancel_fact into an analog value, and the drive circuit 12 supplies the correction current to the beam landing correction coil 15 based on the analog value. The value vcancel_fact is set, for example, in the manufacturing environment. In Step S13, a subroutine calc_vcancel to be described later is executed.

As above described, the horizontal image position correction, the misconvergence correction and the beam mislanding correction which are processed in the form of subroutines may be independently selectively performed or none of them may be performed. The main routine may be adapted to execute only once the reading of the values of geomagnetism detected by the geomagnetism sensor 2 in Step S2 and the above-mentioned series of correction processes to fix the parameters hposi, yvj and vcancel outputted from the D-A converters 7 to 9 when degaussing is carried out, thereby providing the stability of operation.

If it is judged in Step S3 that degaussing is being executed (yes), Step S4 is executed. Step S4 is similar to Steps S6 and S9 in that the CPU 6 gives the values hposi_fact and yvj_fact as the parameters hposi and yvj to the D-A converters 7 and 8, respectively, but differs from Step S12 in that a value which sets the current value to be supplied to the beam landing correction coil 15 at zero is supplied as the parameter vcancel to the D-A converter 9. This allows better degaussing. For instance, the parameter vcancel takes on a value "128" intermediate between the possible digital values "0" and "255."

(IIb) Subroutines

FIG. 5 is a flowchart showing the processing of the subroutine get_sensor executed in Step S2. At the start of the processing of the subroutine get_sensor, a judgement is initially made in Step S14 as to whether or not a zero adjustment in the geomagnetism sensor 2 is being executed. If the zero adjustment is being executed (yes), the flow proceeds to Step S15.

In Step S15, parameters vx_center and vy center are set respectively at values Vx_ave and Vy_ave. The parameters vx_center and vy_center have a meaning respectively as factory-adjusted digital reference values (zeros) of the detection signals Vx and Vy detected by the geomagnetism sensor 2 in the manufacturing environment. The detection signals Vx and Vy provided from the geomagnetism sensor 2 and indicative of the horizontal and vertical magnitudes of geomagnetism are converted into the digital values in the A-D converters 4 and 5, respectively. The values Vx_ave and Vy_ave are, for example, the average value of several (e.g., four) preceding outputs of the respective digital values from the A-D converters 4 and 5 in the manufacturing environment. Although it is not always required to provide the average value of the several preceding outputs, the use of the average value provides the stability of operation. After Step S15 is completed, the flow returns to the main routine shown in FIG. 4.

On the other hand, if the zero adjustment in the geomagnetism sensor 2 is not being executed (no) in Step S14, the flow proceeds to Step S16. In Step S16, a subroutine get_vxy_delta to be described layer is executed. After Step S16 is completed, the flow returns to the main routine shown in FIG. 4.

Figure 6:
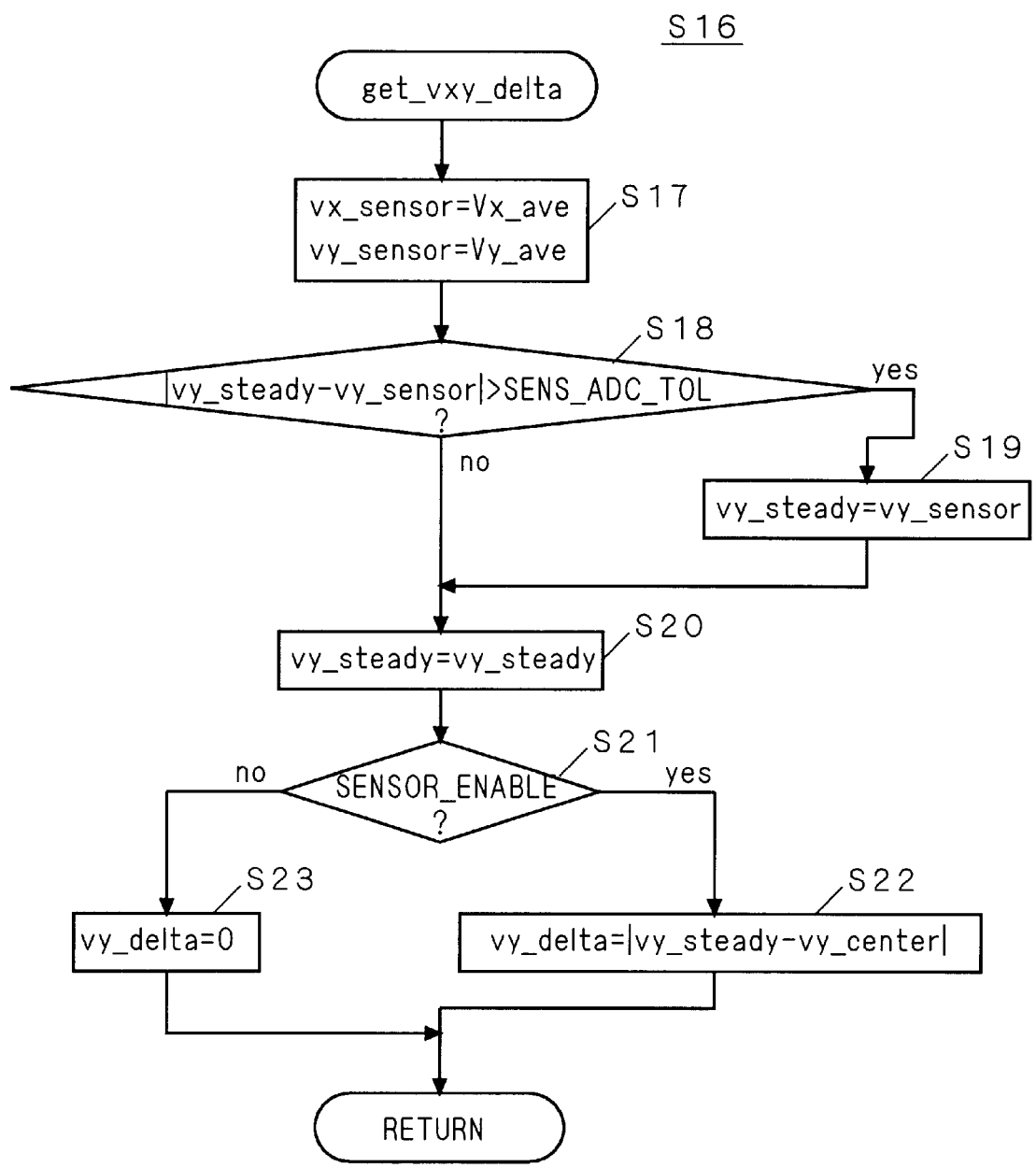

FIG. 6 is a flowchart showing the processing of the subroutine get_vxy_delta executed in Step S16. At the start of the processing of the subroutine get_vxy_delta, parameters vx_sensor and vy_sensor are set respectively at the values Vx_ave and Vy_ave in Step S17 similar to Step S15. Next, the absolute value of a difference between a value vy steady determined by the preceding processing of the subroutine get_vxy_delta and the value of the parameter vy_sensor determined in Step S17 is calculated in Step S18. A judgement is made as to whether or not the absolute value is greater than a predetermined allowable value SENS_ADC_TOL which allows for errors in the A-D converters 4 and 5. If the absolute value is greater than the allowable value SENS_ADC_TOL (yes), the flow proceeds to Step S19. In Step S19, the value of the parameter vy_sensor (which equals the average value Vy_ave of the several (e.g., four) preceding outputs of the digital value in the manufacturing environment, the digital value being obtained by conversion of the detection signal Vy in the A-D converter 5) is substituted for the value vy steady.

After the processing in Step S19 is completed the flow proceeds to Step S20. If the absolute value is not greater than the allowable value SENS_ADC_TOL in Step S18, the flow also proceeds to Step S20. In step S20, the value vy_steady obtained by preceding processing is substituted for the value vy_steady (i.e., not updated). Since the allowable value SENS_ADC_TOL which allows for the errors in the A-D converters 4 and 5 are thus set for the detection signals from the geomagnetism sensor, the value vy_steady is updated if it has varied beyond the errors in the A-D converters 4 and 5, but is neglected if it is within the allowable range of the errors. This achieves the stability of operation.

Next, whether to make a correction (SENSOR_ENABLE) using geomagnetism or not is judged in Step S21. The value of a parameter vy_delta required for the correction using geomagnetism is set in Steps S22 and S23. If the correction is to be made (yes), the flow proceeds to Step S22 in which the absolute value of a difference between the value vy_steady and the value of the parameter vy_center is adopted as the parameter vy_delta. On the other hand, if the correction is not to be made (no), a zero is substituted for the parameter vy_delta in Step S23. After Steps S22 and S23 are completed, the flow returns to the processing of the subroutine get_sensor.

Figure 7:
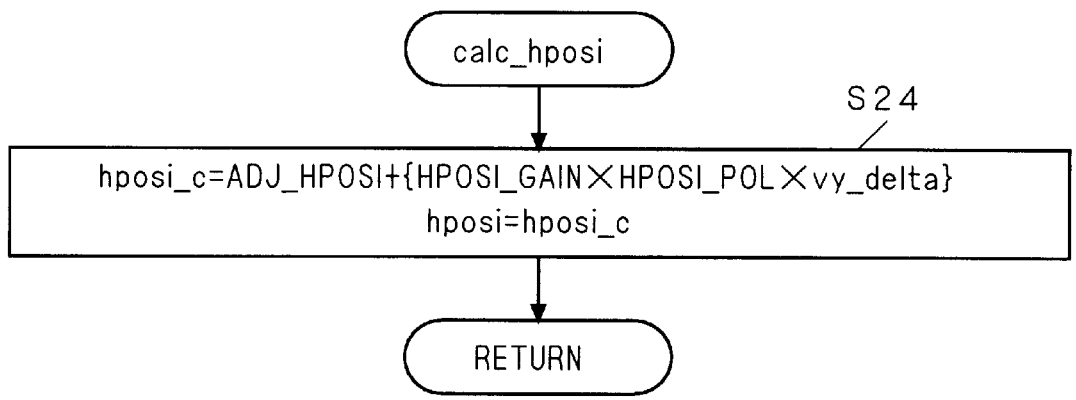

FIG. 7 is a flowchart showing the processing of the subroutine calc_hposi executed in step S7. The subroutine calc_hposi includes Step S24 for calculating a value hposi_c to be given as the parameter hposi from the CPU 6 to the D-A converter 7 when the correction using the deflection yoke 13 is to be made. More specifically, the value hposi_c is given by hposi_c=ADJ_HPOSI+{HPOSI_GAIN×HPOSI_POL×vy_delta} hposi=hposi_c (1)

where ADJ_HPOSI is a factory-adjusted reference value of the parameter hposi, which is set when the horizontal image position correction is made on the influence of geomagnetism, e.g. the vertical component thereof, through the drive circuit 10 in the manufacturing environment or which is the set factory-adjusted reference value modified by a user; HPOSI_GAIN is the absolute value of a correction factor of the correction current to be flowed to the deflection yoke 13 so as to counteract the influence of geomagnetism, e.g. the vertical component thereof, to optimize the horizontal image position; and HPOSI_POL is the polarity of the correction factor. The absolute value HPOSI_GAIN and the polarity HPOSI_POL are determined, for example, by simulation, previously set, and stored in the memory 1. A detailed form of the correction will be described later in the next section (III).

Figure 8:
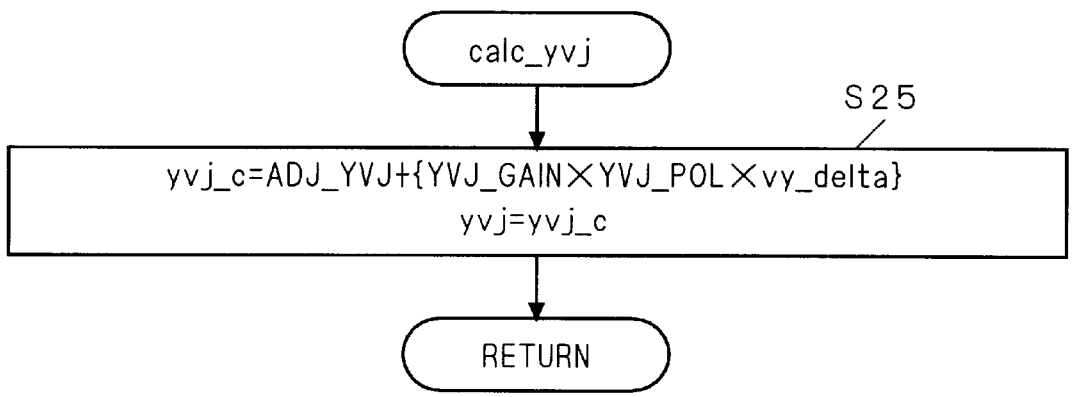

FIG. 8 is a flowchart showing the processing of the subroutine calc_yvj executed in step S10. The subroutine calc_yvj includes Step S25 for calculating a value yvj_c to be given as the parameter yvj from the CPU 6 to the D-A converter 8 when the correction using the convergence correction coil 14 is to be made. More specifically, the value yvj_c is given by yvj_c=ADJ_YVJ+{YVJ_GAIN×YVJ_POL×vy_delta} yvj=yvj_c (2)

where ADJ_YVJ is a factory-adjusted reference value of the parameter yvj, which is set when the convergence correction is made on the influence of geomagnetism, e.g. the vertical component thereof, through the drive circuit 11 in the manufacturing environment or which is the set factory-adjusted reference value modified by the user; YVJ_GAIN is the absolute value of a correction factor of the correction current to be flowed to the convergence correction coil 14 so as to counteract the influence of geomagnetism, e.g. the vertical component thereof, to optimize the convergence; and YVJ_POL is the polarity of the correction factor. The absolute value YVJ_GAIN and the polarity YVJ_POL are determined, for example, by simulation, previously set, and stored in the memory 1. A detailed form of the correction will be described later in the next section (III).

Figure 9:
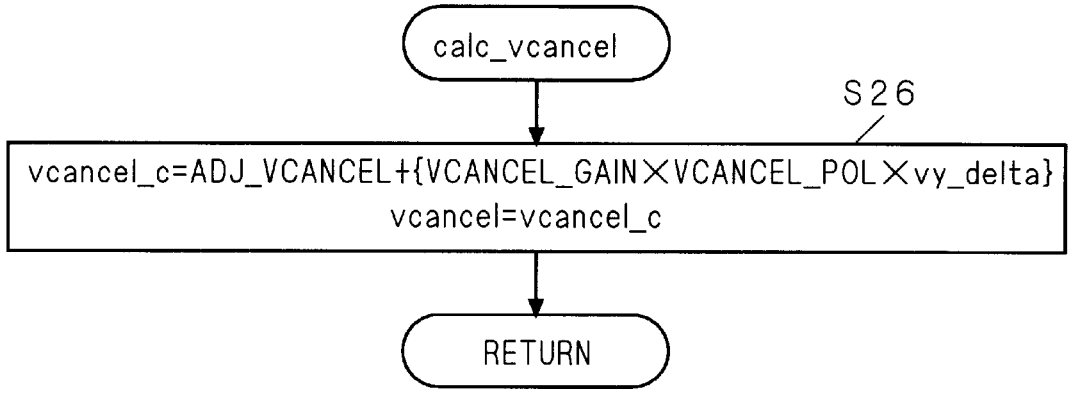

FIG. 9 is a flowchart showing the processing of the subroutine calc_vcancel executed in step S13. The subroutine calc_vcancel includes Step S26 for calculating a value vcancel_c to be given as the parameter vcancel from the CPU 6 to the D-A converter 9 when the correction using the beam landing correction coil 15 is to be made. More specifically, the value vcancel_c is given by $$vcancel\_c = ADJ\_VCANCEL + \{VCANCEL\_GAIN \times VCANCEL\_POL \times vy\_delta\}$$

$$vcancel = vcancel\_c \quad (3)$$

where ADJ_VCANCEL is a factory-adjusted reference value of the parameter vcancel, which is set when the beam landing correction is made on the influence of geomagnetism, e.g. the vertical component thereof, through the drive circuit 12 in the manufacturing environment or which is the set factory-adjusted reference value modified by the user; VCANCEL_GAIN is the absolute value of a correction factor of the correction current to be flowed to the beam landing correction coil 15 so as to counteract the influence of geomagnetism, e.g. the vertical component thereof, to optimize the beam landing; and VCANCEL_POL is the polarity of the correction factor. The absolute value VCANCEL_GAIN and the polarity VCANCEL_POL are determined, for example, by simulation, previously set, and stored in the memory 1. A detailed form of the correction will be described later in the next section (III).

The geomagnetism compensating device which operates as described hereinabove may use geomagnetism, e.g. the vertical component thereof, detected by the geomagnetism sensor 2 to accomplish software-controlled corrections for determining the current values to be supplied to the deflection yoke 13, the convergence correction coil 14 and the beam landing correction coil 15. Thus, the geomagnetism compensating device can automatically and satisfactorily correct the horizontal image position, convergence and beam landing when the direction of geomagnetism is changed with respect to the CRT 16 which is installed or moved. This permits the user to readily install or move the CRT display device employing the high-definition CRT without the need for special measuring equipment and expert knowledge.

Additionally, the absolute value and polarity of each correction factor which are stored in the memory 1 may be arbitrarily changed. This facilitates changes in correction amount. Furthermore, the computations use the factory-adjusted reference values ADJ_HPOSI, ADJ_YVJ and ADJ_VCANCEL of the parameters hposi, yvj and vcancel, and the change vy_delta in vertical intensity of geomagnetism with respect to that in the manufacturing environment. Therefore, the computations are not affected by individual variations, if any, of the CRT 16 including the deflection yoke 13, the convergence correction coil 14 and the beam landing correction coil 15, and the geomagnetism sensor 2, to achieve precise corrections.

Figure 10:
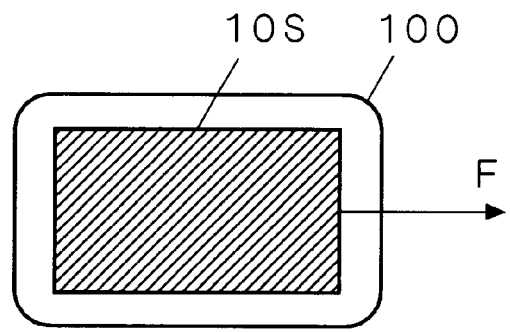
FIG. 10 is a conceptual view illustrating a horizontal image position.

(III) Detailed Forms of Compensation
(IIIa) Horizontal Image Position Correction FIG. 10 is a conceptual view illustrating a positional relationship between a display screen 100 of the CRT 16 and a raster image 10S displayed on the display screen 100. The deflection yoke 13 shall be mounted in such an orientation that the greater the value of the parameter hposi outputted from the D-A converter 7, the greater the displacement (change in horizontal image position) of the raster image 10S along the horizontally rightward arrow F of FIG. 10. The direction of the arrow F is assumed to be positive hereinafter. The drive circuit 10 shall be designed, for example, so that the current value to be supplied to the deflection yoke 13 changes by ±1.0 mA when the digital value changes by ±1. When the CRT 16 has, for example, a 21-inch diagonal screen, the horizontal image position changes by ±0.1 mm when the digital value changes by ±1.

In such cases, the absolute value HPOSI_GAIN and the polarity HPOSI_POL of the correction factor are set in a manner to be described below when geomagnetism, e.g. the vertical component thereof, is changed.

Figure 11:
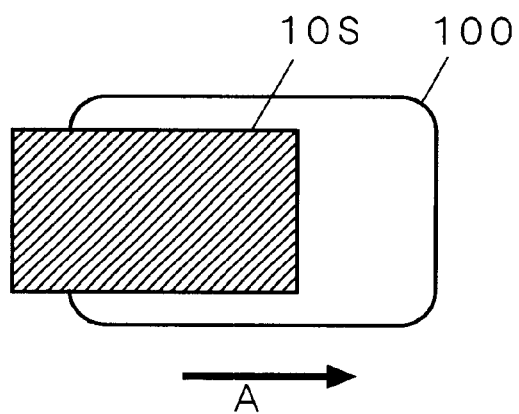
FIGS. 11 and 12 are conceptual views schematically illustrating changes in horizontal image position.
Figure 12:
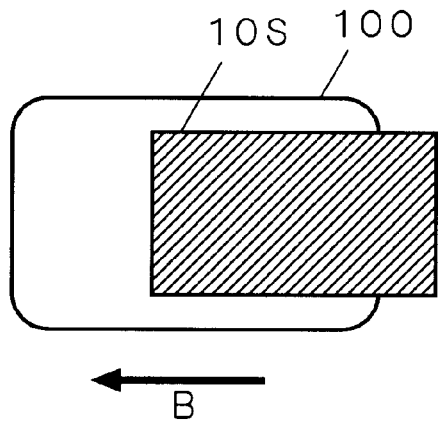

Initially, the horizontal image position correction is normally performed on the display device including the geomagnetism compensating device shown in FIG. 4 and the CRT 16 in the manufacturing environment. Next, a change in horizontal image position is measured in the presence of a magnetic field applied to the display device when the display device is placed in the Northern Hemisphere and the Southern Hemisphere. FIGS. 11 and 12 are conceptual views schematically illustrating changes in horizontal image position when the display device is placed in the Northern Hemisphere and the Southern Hemisphere, respectively. The change in horizontal image position is dependent on the vertical intensity of geomagnetism but is not dependent on the horizontal intensity thereof. For instance, the change in horizontal image position was −2.0 mm under the environmental conditions in the Northern Hemisphere that the horizontal magnetic field =±0 mT and the vertical magnetic field =+0.08 mT. In another instance, the change in horizontal image position was +4.0 mm under the environmental conditions in the Southern Hemisphere that the horizontal magnetic field =±0 mT and the vertical magnetic field =−0.04 mT. These changes in horizontal image position are corrected by moving the horizontal image position in the directions of the arrows A and B of FIGS. 11 and 12, respectively. Such a correction may be achieved by controlling the current to be flowed to the deflection yoke 13.

In the instance shown in FIG. 11, the raster image 10S should be moved by +2.0 mm in the positive horizontal direction. Then, the setting is made such that HPOSI_GAIN=20 and HPOSI_POL="+." In the instance shown in FIG. 12, the raster image 10S should be moved by −4.0 mm in the positive horizontal direction. Then, the setting is made such that HPOSI_GAIN=40 and HPOSI_POL="−." The values "+1" and "−1" are used respectively to represent the signs "+" and "−" of the value HPOSI_POL for the calculations given by Equation (1).

The vertical intensity of geomagnetism detected by the geomagnetism sensor 2 in the manufacturing environment is, for example, +0.04 mT as above described. Then, the average value Vy_ave of the digital values for the detection signal Vy is set at "150" based on the graph shown in FIG. 3. This average value Vy_ave =150 is employed as the values of the parameters vy_center and vy_sensor in Step S15 (FIG. 5) and Step S17 (FIG. 6).

On the other hand, the vertical magnetic field =+0.08 mT under the above-mentioned environmental conditions in the Northern Hemisphere. The average value Vy_ave in this case is set at "170" based on the graph of FIG. 3. This average value Vy_ave=170 is employed as the value of the parameter vy_sensor in Step S17 (FIG. 6). Therefore, the value of the parameter vy_delta is determined as |150−170|=20 in Steps S19 and S22 (FIG. 6) under the environmental conditions in the Northern Hemisphere.

The vertical magnetic field =−0.04 mT under the above-mentioned environmental conditions in the Southern Hemisphere. The average value Vy_ave in this case is set at "110" based on the graph of FIG. 3. This average value Vy_ave=110 is employed as the value of the parameter vy_sensor in Step S17 (FIG. 6). Therefore, the value of the parameter vy_delta is determined as |150−110|=40 in Steps S19 and S22 (FIG. 6) under the environmental conditions in the Southern Hemisphere.

Consequently, the value hposi_c of the parameter hposi is determined as ADJ_HPOSI+20/20×(+1)×20=ADJ_HPOSI+20 in Step S24 (FIG. 7) according to Equation (1) under the environmental conditions in the Northern Hemisphere. Likewise, the value hposi_c is determined as ADJ_HPOSI +40/40×(−1)×40=ADJ_HPOSI−40 under the environmental conditions in the Southern Hemisphere. In this case, the amount of correction of the current to be flowed to the deflection yoke 13 is a maximum of 20 mA under the environmental conditions in the Northern Hemisphere and a maximum of 40 mA under the environmental conditions in the Southern Hemisphere.

(IIIb) Convergence Correction

Figure 13:
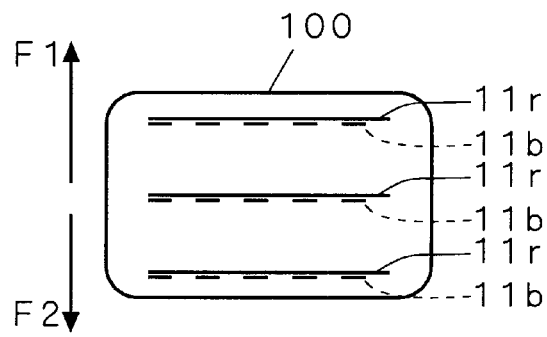
FIG. 13 is a conceptual view illustrating convergence.

FIG. 13 is a conceptual view schematically illustrating the display screen 100 of the CRT 16 and convergence on the display screen 100. Three horizontal straight lines displayed on the display screen 100 are taken as an example hereinafter. A middle one of the three lines is displayed at the center of the display screen 100. Lines designated by 11r and 11b represent the positions of red and blue light emission, respectively. The convergence is shown as properly adjusted in FIG. 13.

The convergence correction coil 14 shall be mounted in such an orientation that the greater the value of the parameter yvj outputted from the D-A converter 8, the greater the displacement (the amount of misconvergence) of the red light emission positions 11r in an outward direction from the blue light emission positions 11b, that is, in an upward direction F1 if the lines are displayed on the upper half of the display screen 100 and in a downward direction F2 if the lines are displayed on the lower half thereof. Since the directions of misconvergence on the upper and lower halves of the display screen 100 are opposite from each other with respect to the vertical intensity of geomagnetism, the directions of the arrows F1 and F2 are assumed to be positive on the upper and lower halves of the display screen 100 respectively, and attention will be given to the amount of misconvergence at a position with the greatest misconvergence hereinafter.

The drive circuit 11 shall be designed, for example, so that the current value to be supplied to the convergence correction coil 14 changes by ±1.0 mA when the digital value changes by ±1. When the CRT 16 has, for example, a 21-inch diagonal screen, the amount of misconvergence is ±0.01 mm when the digital value changes by ±1.

In such cases, the absolute value YVJ_GAIN and the polarity YVJ_POL of the correction factor are set in a manner to be described below when geomagnetism, e.g. the vertical component thereof, is changed.

Figure 14:
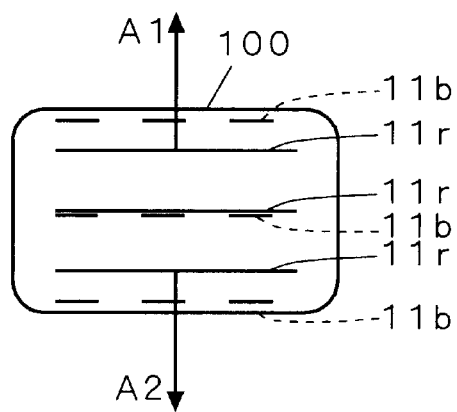
FIGS. 14 and 15 are conceptual views schematically illustrating the amount of misconvergence.
Figure 15:
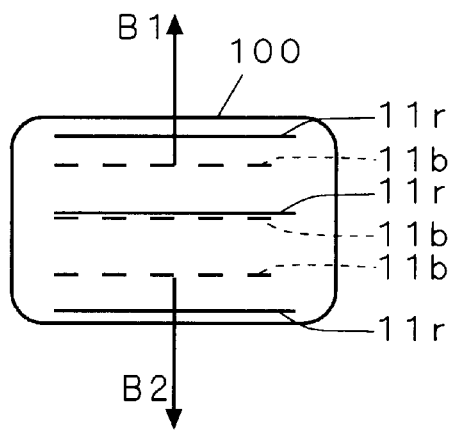

Initially, the convergence correction is normally performed on the display device including the geomagnetism compensating device shown in FIG. 4 and the CRT 16 in the manufacturing environment. Next, the amount of misconvergence is measured under the environmental conditions in the Northern Hemisphere and under the environmental conditions in the Southern Hemisphere for the display device. FIGS. 14 and 15 are conceptual views schematically illustrating the amounts of misconvergence when the display device is placed under the environmental conditions in the Northern Hemisphere and under the environmental conditions in the Southern Hemisphere, respectively. The amount of misconvergence was −0.1 mm under the environmental conditions in the Northern Hemisphere that the horizontal magnetic field =±0 mT and the vertical magnetic field =+0.08 mT. The convergence correction is performed on such misconvergence so that the red light emission position 11r on the upper half of the display screen 100 moves in the direction of the arrow A1 and the red light emission position 11r on the lower half of the display screen 100 moves in the direction of the arrow A2. In another instance, the amount of misconvergence was +0.2 mm under the environmental conditions in the Southern Hemisphere that the horizontal magnetic field =±0 mT and the vertical magnetic field =−0.04 mT. The convergence correction is performed on such misconvergence so that the blue light emission position 11b on the upper half of the display screen 100 moves in the direction of the arrow B1 and the blue light emission position 11b on the lower half of the display screen 100 moves in the direction of the arrow B2. Such a correction may be achieved by controlling the current to be flowed to the convergence correction coil 14.

In the instance shown in FIG. 14, the setting is made such that YVJ_GAIN =10 and YVJ_POL="+." In the instance shown in FIG. 15, the setting is made such that YVJ_GAIN=20 and YVJ_POL="−." The values "+1" and "−1" are used respectively to represent the signs "+" and "−" of the value YVJ_POL for the calculations given by Equation (2).

The vertical intensity of geomagnetism detected by the geomagnetism sensor 2 is, for example, +0.04 mT in the manufacturing environment, +0.08 mT under the environmental conditions in the Northern Hemisphere, and −0.04 mT under the environmental conditions in the Southern Hemisphere, as above described. Therefore, the value of the parameter vy_delta is determined as "20" under the environmental conditions in the Northern Hemisphere and as "40" under the environmental conditions in the Southern Hemisphere as described above (in Section IIIa). Consequently, the value yvj_c of the parameter yvj is determined as ADJ_YVJ+10/20×(+1)×20=ADJ_YVJ+10 in Step S25 (FIG. 8) according to Equation (2) under the environmental conditions in the Northern Hemisphere. Likewise, the value yvj_c is determined as ADJ_YVJ+20/40×(−1)×40=ADJ_YVJ−20 under the environmental conditions in the Southern Hemisphere. In this case, the amount of correction of the current to be flowed to the convergence correction coil 14 is a maximum of 10 mA under the environmental conditions in the Northern Hemisphere and a maximum of 20 mA under the environmental conditions in the Southern Hemisphere.

(IIIc) Beam Landing Correction

Figure 16:
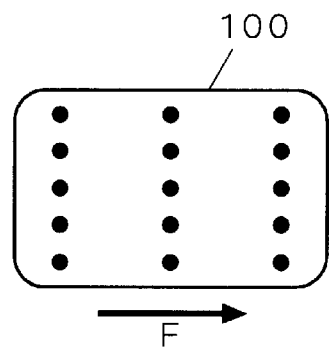
FIGS. 16 and 17 are conceptual views illustrating beam landing.
Figure 17:
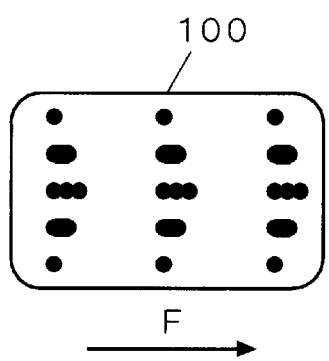

FIGS. 16 and 17 are conceptual views schematically illustrating the display screen 100 of the CRT 16 and beam landing on the display screen 100. For purposes of convenience, there are shown 15 dots arranged in a matrix with five rows and three columns. The beam landing is shown as properly adjusted in FIG. 16. FIG. 17 shows the arrangement of the 15 dots when beam mislanding occurs.

The term "beam mislanding" used herein means a deviation of the landing of electron beams in the horizontal direction of the display screen 100 due to the vertical intensity of geomagnetism, which causes a degradation in purity in the horizontal direction of the display screen 100. The lateral expansion of the dots in FIG. 17 represents the beam landing deviation which is most remarkable at the center of the screen and decreases in the upward and downward directions of the screen.

The beam landing correction coil 15 shall be mounted in such an orientation that the greater the value of the parameter vcancel outputted from the D-A converter 9, the greater the amount of mislanding of red, green and blue beams corresponding to one dot in the direction of the arrow F. The amount of beam mislanding at the center of the display screen 100 is employed hereinafter, with the direction of the arrow F assumed to be positive. In the same ambient magnetic field environment, the value of the parameter vcancel employed to provide the arrangement of the 15 dots shown in FIG. 17 is greater than that employed to provide the arrangement shown in FIG. 16.

The drive circuit 12 shall be designed, for example, so that the current value to be supplied to the beam landing correction coil 15 changes by ±1.0 mA when the digital value changes by ±1. When the CRT 16 has, for example, a 21-inch diagonal screen, the amount of beam mislanding is ±0.1 μm when the digital value changes by ±1.

In such cases, the absolute value VCANCEL_GAIN and the polarity VCANCEL_POL of the correction factor are set in a manner to be described below when geomagnetism, e.g. the vertical component thereof, is changed.

Figure 18:
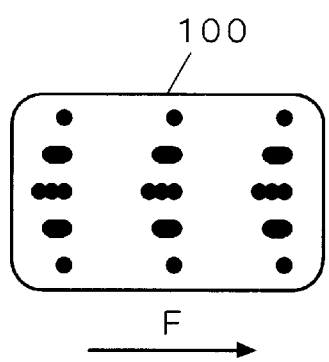
FIGS. 18 and 19 are conceptual views schematically illustrating the amount of beam mislanding.
Figure 19:
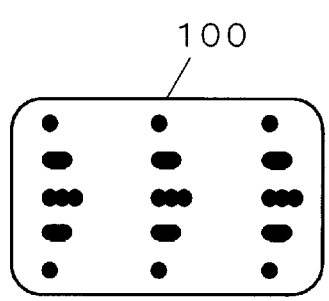

Initially, the beam landing correction is normally performed on the display device including the geomagnetism compensating device shown in FIG. 4 and the CRT 16 in the manufacturing environment. Next, the amount of beam mislanding is measured under the environmental conditions in the Northern Hemisphere and under the environmental conditions in the Southern Hemisphere for the display device. FIGS. 18 and 19 are conceptual views schematically illustrating the amounts of beam mislanding when the display device is placed under the environmental conditions in the Northern Hemisphere and under the environmental conditions in the Southern Hemisphere, respectively.

The amount of beam mislanding was −4.0 μm under the environmental conditions in the Northern Hemisphere that the horizontal magnetic field=±0 mT and the vertical magnetic field=+0.08 mT. The beam landing correction is performed on such beam mislanding so that the electron beams move in the direction of the arrow F before beam landing. In another instance, the amount of beam mislanding was +12.0 μm under the environmental conditions in the Southern Hemisphere that the horizontal magnetic field=±0 mT and the vertical magnetic field=−0.04 mT. The beam landing correction is performed on such beam mislanding so that the electron beams move in the direction opposite from the direction of the arrow F before beam landing. Such a correction may be achieved by controlling the current to be flowed to the beam landing correction coil 15.

In the instance shown in FIG. 18, the setting is made such that VCANCEL_GAIN=40 and VCANCEL_POL="+." In the instance shown in FIG. 19, the setting is made such that VCANCEL_GAIN=120 and VCANCEL_POL="−." The values "+1" and "−1" are used respectively to represent the signs "+" and "−" of the value VCANCEL_POL for the calculations given by Equation (3).

The vertical intensity of geomagnetism detected by the geomagnetism sensor 2 is, for example, +0.04 mT in the manufacturing environment, +0.08 mT under the environmental conditions in the Northern Hemisphere, and −0.04 mT under the environmental conditions in the Southern Hemisphere, as above described. Therefore, the value of the parameter vy_delta is determined as "20" under the environmental conditions in the Northern Hemisphere and as "40" under the environmental conditions in the Southern Hemisphere as described above (in Section IIIa). Consequently, the value vcancel_c of the parameter vcancel is determined as ADJ_VCANCEL +40/20×(+1)×20=ADJ_VCANCEL+40 in Step S26 (FIG. 9) according to Equation (3) under the environmental conditions in the Northern Hemisphere. Likewise, the value vcancel_c is determined as ADJ_VCANCEL+120/40×(−1)×40=ADJ_YVJ−120 under the environmental conditions in the Southern Hemisphere. In this case, the amount of correction of the current to be flowed to the beam landing correction coil 15 is a maximum of 40 mA under the environmental conditions in the Northern Hemisphere and a maximum of 120 mA under the environmental conditions in the Southern Hemisphere.

Although the respective correction factors are divided into the absolute values HPOSI_GAIN, YVJ_GAIN, VCANCEL_GAIN thereof and the polarities HPOSI_POL, YVJ_POL, VCANCEL_POL thereof in the above description, the correction factors may contain the positive and negative signs.

Figure 20:
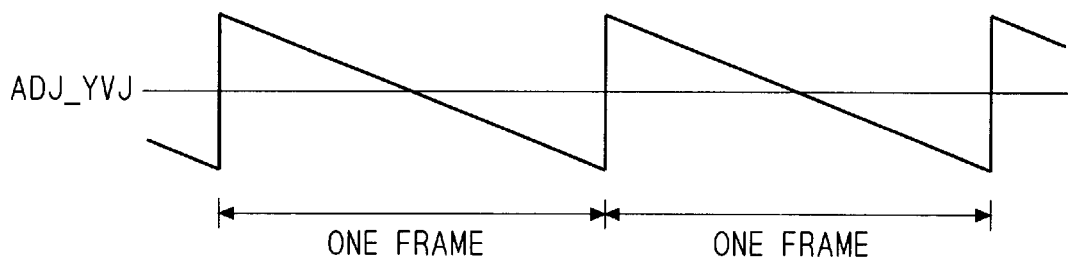
FIGS. 20 through 24 are graphs schematically showing changes in parameter values.

(VI) Detailed Description with Attention Given to Vertical Intensity of Geomagnetism (VIa) Convergence Correction As described above in Section (IIIb), the misconvergence on the display screen 100 under the influence of the vertical component of geomagnetism is such that the directions thereof on the upper and lower halves of the display screen 100 are opposite from each other. FIG. 20 is a graph schematically showing a variation in the value of the parameter yvj outputted from the D-A converter 8 for each frame displayed. Thus, the variation in the value of the parameter yvj must be synchronized with vertical deflection for each frame. To this end, the CPU 6 receives and modulates the vertical deflection signal VH to generate the parameter yvj which varies as shown in FIG. 20.

The parameter yvj shown in FIG. 20 for a time period corresponding to one frame is represented by a line segment which varies unidirectionally with a fixed gradient (i.e., at a constant rate of change with time except during the transition from one frame to another). The value of the parameter yvj may be set so as to vary around the value ADJ_YVJ with an amplitude of YVJ_GAIN×YVJ_POL×vy_delta.

Figure 21:
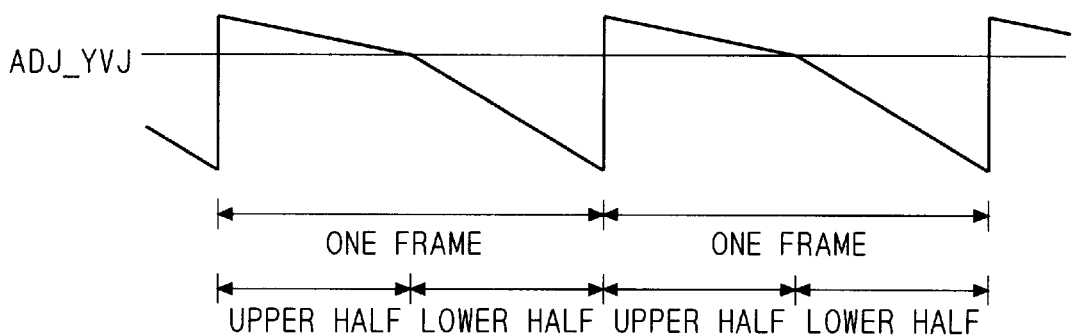

As shown in FIG. 20, such a convergence correction can optimize the amounts of convergence on the upper and lower halves of the display screen 100 in symmetrical fashion, and is easily made in that the memory 1 stores a smaller number of values therein. Alternatively, the convergence correction may be made to optimize the amounts of convergence on the upper and lower halves of the display screen 100 in asymmetrical fashion by setting separate absolute values YVJ_GAIN of the correction factor for the upper and lower halves of the display screen 100. This technique is used, for example, when electron guns of the CRT 16 are not perpendicularly opposed to the center of the display screen 100. FIG. 21 is a graph showing the value of the parameter yvj in such a case. The parameter yvj shown in FIG. 21 for a time period corresponding to one frame is represented by two continuous line segments which varies unidirectionally but have different gradients (i.e., at two rates of change with time) corresponding respectively to the upper and lower halves of the display screen 100.

(VIb) Beam Landing Correction

Figure 22:
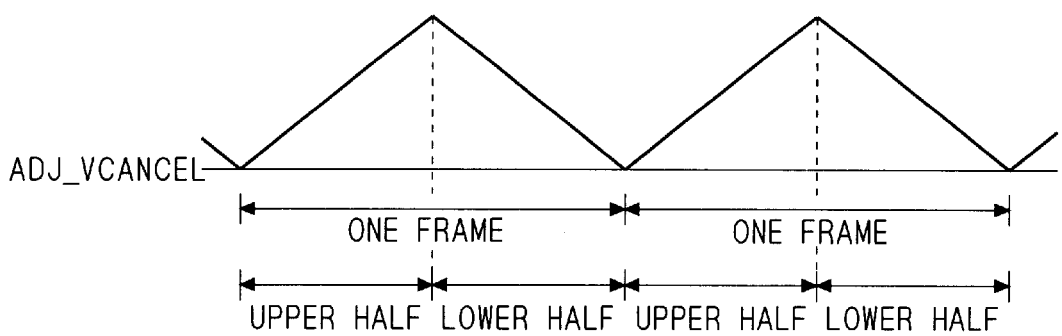
Figure 23:
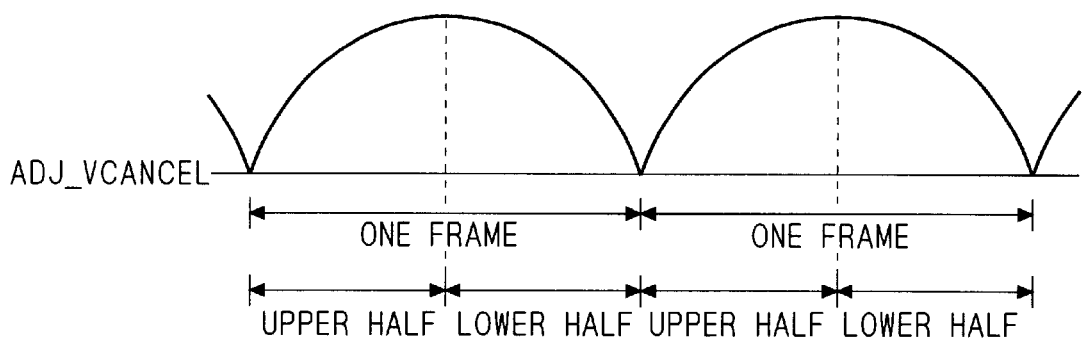

As described above in Section (IIIc), the beam mislanding on the display screen under the influence of the vertical component of geomagnetism is most remarkable at the center of the display screen 100, exhibits variations in the same direction on the upper and lower halves of the display screen 100, and decreases in the upward and downward directions. FIGS. 22 and 23 are graphs schematically showing variations in the value of the parameter vcancel outputted from the D-A converter 9 for each frame displayed. Thus, the variation in the value of the parameter vcancel must be synchronized with vertical deflection for each frame. To this end, the CPU 6 receives and modulates the vertical deflection signal VH to generate the parameter vcancel which varies as shown in FIG. 22.

The parameter vcancel shown in FIG. 22 has a peak at the midpoint of the time period corresponding to one frame and is represented by two continuous line segments having symmetrical gradients with respect to the peak. The value of the parameter vcancel may be set so as to have an extremum of VCANCEL_GAIN×VCANCEL_POL×vy_delta relative to the value ADJ_VCANCEL. Additionally, the parameter vcancel need not have such a triangular waveform but may have a waveform of a quadratic function as shown in FIG. 23.

Figure 24:
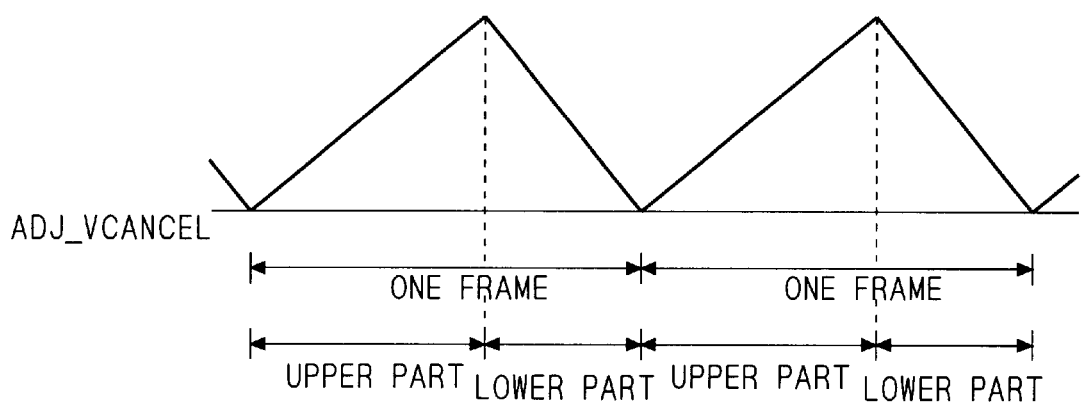

As shown in FIGS. 22 and 23, such a beam landing correction can optimize the amounts of beam landing on the upper and lower halves of the display screen 100 in symmetrical fashion, and is easily made in that the memory 1 stores a smaller number of values therein. Alternatively, the beam landing correction may be made to optimize the amounts of beam landing on the upper and lower halves of the display screen 100 in asymmetrical fashion by setting separate absolute values VCANCEL_GAIN of the correction factor for the upper and lower halves of the display screen 100. This technique is used, for example, when the electron guns of the CRT 16 are not perpendicularly opposed to the center of the display screen 100. FIG. 24 is a graph showing the value of the parameter vcancel when the electron guns are positioned below the center of the display screen 100. The parameter veancel shown in FIG. 24 for the time period corresponding to one frame is represented by two continuous line segments with different gradients corresponding respectively to an upper part of the display screen 100 which lies above the electron guns and a lower part thereof which lies below the electron guns, but has a peak deviated from the midpoint CENT of the time period corresponding to one frame to exhibit an asymmetrical waveform with respect to the midpoint CENT.

Furthermore, the parameter vcancel may be controlled by the value ADJ_VCANCEL which specifies a DC level to counteract the influence of variations due to individual differences in the CRT 16 which include variations in the beam landing correction coil 15.

While the invention has been described in detail, the foregoing description is in all aspects illustrative and not restrictive. It is understood that numerous other modifications and variations can be devised without departing from the scope of the invention.

What is claimed is:

1. An environmental magnetism compensating device comprising:

a magnetism sensor for detecting a vertical component of a magnetic environment in which a cathode-ray tube including a deflection yoke, a convergence correction coil and a beam landing correction coil is placed to output a detection signal;

an arithmetic unit for determining first to third parameters based on said detection signal; and a driver for supplying current having values set based on said first to third parameters, respectively, to said deflection yoke, said convergence correction coil and said beam landing correction coil.

2. The environmental magnetism compensating device according to claim 1, wherein said current supplied to said convergence correction coil varies at a single rate of change in synchronism with a vertical deflection signal for said cathode-ray tube.

3. The environmental magnetism compensating device according to claim 1, wherein said current supplied to said convergence correction coil varies at two difference rates of change for a time period corresponding to one frame in synchronism with a vertical deflection signal for said cathode-ray tube.

4. The environmental magnetism compensating device according to claim 1, wherein said current supplied to said beam landing correction coil is in synchronism with a vertical deflection signal for said cathode-ray tube and has a waveform symmetrical with respect to a midpoint of a time period corresponding to one frame.

5. The environmental magnetism compensating device according to claim 4, wherein said current supplied to said beam landing correction coil varies linearly.

6. The environmental magnetism compensating device according to claim 4, wherein said current supplied to said beam landing correction coil varies non-linearly.

7. The environmental magnetism compensating device according to claim 1, wherein said current supplied to said beam landing correction coil is in synchronism with a vertical deflection signal for said cathode-ray tube and has a waveform asymmetrical with respect to a midpoint of a time period corresponding to one frame.

8. The environmental magnetism compensating device according to claim 4, wherein said current supplied to said beam landing correction coil has a variable DC level.

9. The environmental magnetism compensating device according to claim 5, wherein said current supplied to said beam landing correction coil has a variable DC level.

10. A cathode-ray tube display device comprising:

(a) a cathode-ray tube including a deflection yoke, a convergence correction coil and a beam landing correction coil; and (b) an environmental magnetism compensating device including:

a magnetism sensor for detecting a vertical component of a magnetic environment in which said cathode-ray tube is placed to output a detection signal;

an arithmetic unit for determining first to third parameters based on said detection signal; and a driver for supplying current having values set based on said first to third parameters, respectively, to said deflection yoke, said convergence correction coil and said beam landing correction coil.

11. The cathode-ray tube display device according to claim 10, wherein said current supplied to said convergence correction coil varies at a single rate of change in synchronism with a vertical deflection signal for said cathode-ray tube.

12. The cathode-ray tube display device according to claim 10, wherein said current supplied to said convergence correction coil varies at two difference rates of change for a time period corresponding to one frame in synchronism with a vertical deflection signal for said cathode-ray tube.

13. The cathode-ray tube display device according to claim 10, wherein said current supplied to said beam landing correction coil is in synchronism with a vertical deflection signal for said cathode-ray tube and has a waveform symmetrical with respect to a midpoint of a time period corresponding to one frame.

14. The cathode-ray tube display device according to claim 13, wherein said current supplied to said beam landing correction coil varies linearly.

15. The cathode-ray tube display device according to claim 13, wherein said current supplied to said beam landing correction coil varies nonlinearly.

16. The cathode-ray tube display device according to claim 10, wherein said current supplied to said beam landing correction coil is in synchronism with a vertical deflection signal for said cathode-ray tube and has a waveform asymmetrical with respect to a midpoint of a time period corresponding to one frame.

17. The cathode-ray tube display device according to claim 16, wherein said current supplied to said beam landing correction coil has a variable DC level.

18. The cathode-ray tube display device according to claim 13, wherein said current supplied to said beam landing correction coil has a variable DC level.

* * * * *